(12) United States Patent
Huckins

(10) Patent No.: US 7,032,239 B1
(45) Date of Patent: Apr. 18, 2006

(54) PROVIDING CONTENT DESCRIPTION AND CONNECTION INFORMATION IN DIGITAL BROADCAST NETWORKS

(75) Inventor: Jeffrey L. Huckins, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/512,226

(22) Filed: Feb. 24, 2000

(51) Int. Cl.
*H04N 7/16* (2006.01)
*H04N 5/445* (2006.01)
*H04N 7/173* (2006.01)
*G06F 3/00* (2006.01)
*G06F 13/00* (2006.01)

(52) U.S. Cl. .......................... 725/146; 725/39; 725/50; 725/54; 725/82; 725/85; 725/90; 725/91; 725/93; 725/98; 725/140; 725/145; 725/148; 725/152

(58) Field of Classification Search .................. 725/39, 725/50, 54, 82, 85, 90, 91, 93, 98, 140, 145, 725/146, 148, 152
See application file for complete search history.

(56) References Cited

U.S. PATENT DOCUMENTS

| | | | |
|---|---|---|---|
| 5,418,782 A * | 5/1995 | Wasilewski | 370/486 |
| 5,600,378 A | 2/1997 | Wasilewski | |
| 5,686,954 A * | 11/1997 | Yoshinobu et al. | 725/43 |
| 5,886,995 A * | 3/1999 | Arsenault et al. | 370/477 |
| 6,005,561 A * | 12/1999 | Hawkins et al. | 707/500.1 |
| 6,064,378 A * | 5/2000 | Chaney et al. | 725/39 |
| 6,115,074 A * | 9/2000 | Ozkan et al. | 348/465 |
| 6,160,545 A * | 12/2000 | Eyer et al. | 345/721 |
| 6,278,717 B1 * | 8/2001 | Arsenault et al. | 370/477 |
| 6,414,720 B1 * | 7/2002 | Tsukidate et al. | 348/469 |
| 6,460,181 B1 * | 10/2002 | Donnelly | 725/50 |
| 6,510,556 B1 * | 1/2003 | Kusaba et al. | 725/93 |
| 2004/0117831 A1 * | 6/2004 | Ellis et al. | 725/53 |

FOREIGN PATENT DOCUMENTS

| | | |
|---|---|---|
| CN | 1182329 A | 5/1998 |
| EP | 0 828 390 A2 | 3/1998 |
| EP | 828390 A2 * | 3/1998 |
| EP | 0 838 915 A2 | 4/1998 |

\* cited by examiner

*Primary Examiner*—John Miller
*Assistant Examiner*—Michael W. Hoye
(74) *Attorney, Agent, or Firm*—Trop, Pruner & Hu, PC

(57) ABSTRACT

A system enables connection information and content description information to be separately transmitted from a broadcaster to a receiver. Thus, the description of the content may be provided to a receiver prior to the time that the information needed to specify the connection to the service such as a channel is known. By uncoupling the content description and connection information, the assignment of connection information may be managed dynamically in the broadcast network.

17 Claims, 5 Drawing Sheets

PROVIDING CONTENT DESCRIPTION AND CONNECTION INFORMATION IN DIGITAL BROADCAST NETWORKS

BACKGROUND

The invention relates to digital broadcast networks and to techniques for communicating broadcast information.

Digital broadcasting systems may provide high quality video and audio and ancillary data over one or more channels. The resolution possible with a digital system may be many times higher than that of conventional television. This resolution may be achieved, even with a large number of channels, by reducing the bit rate of the transferred data. Such bit rate reductions may be achieved by efficiently utilizing available channel capacity and by exploiting complex video and audio compression technology.

To achieve higher resolution with reasonable bandwidth requirements, the information passed through the data channel is maximized while minimizing the amount of data required to represent the video image sequence and its associated audio. Thus, the broadcast system may include source coding and compression which relates to the use of bit rate reduction methods such as data compression.

Since the source may include not only video and audio but additional so-called ancillary data, the ancillary data may be compressed as well. The ancillary data may include control data, conditional access control data, and data associated with the program audio and video services, such as closed captioning. The ancillary data may also include independent program services.

Digital broadcast systems also include service multiplex and transport that refers to the division of the data stream into packets of information, techniques for identifying each packet, and methods of multiplexing the video data stream packets, audio data stream packets and ancillary data stream packets into a single data stream. Ideally, these systems work with a variety of video sources including terrestrial broadcasting, cable distribution, satellite distribution and existing recording media and computer interfaces for example. The MPEG-2 transport stream syntax is used for packetization and multiplexing of video, audio and data signals under existing standards.

A digital broadcasting system may also include an RF/transmission system which relates to the coding of channels and modulation. The channel coder adds information to a data bit stream which may be used at the receiver to recover the data even when the data may be affected by transmission errors.

Thus, digital broadcasting systems offer the possibility of higher resolution using existing protocols. Because of the use of compression, the number of available channels may be increased increasing the complexity of the overall broadcast system. Moreover, even with the use of compression techniques, the available bandwidth may commonly be fully utilized necessitating the use of techniques to transition bandwidth requests to intervals when bandwidth is available.

As a result of such techniques, information may be utilized to reconstruct the transmitted information. This transmitted information may be associated with particular channels so that the user can select a channel for viewing at any given time. However, the broadcaster may be capable of providing the information on any one of a variety of channels. For example, cable or satellite operators have complete control over what goes on what channels. Thus, in a digital broadcast system, it is possible to dynamically assign channels to information based on bandwidth or other considerations. As a result, connection information may be provided in the broadcast stream which associates audio/video content with a given channel. In addition, content information may be provided which provides a description of content that is or will be provided over the broadcast system.

In some cases, it may be desirable to have information about the audio/visual content prior to the time that the actual content information becomes available. For example, the content information may be utilized to develop an electronic content guide (also known as an electronic programming guide). However, with existing broadcast standards, an announcement stream is transmitted which provides both the information about the content and the information about how to connect to the content.

Thus, there is a continuing need for better ways to broadcast information in digital broadcast networks.

DETAILED DESCRIPTION

Figure 1:
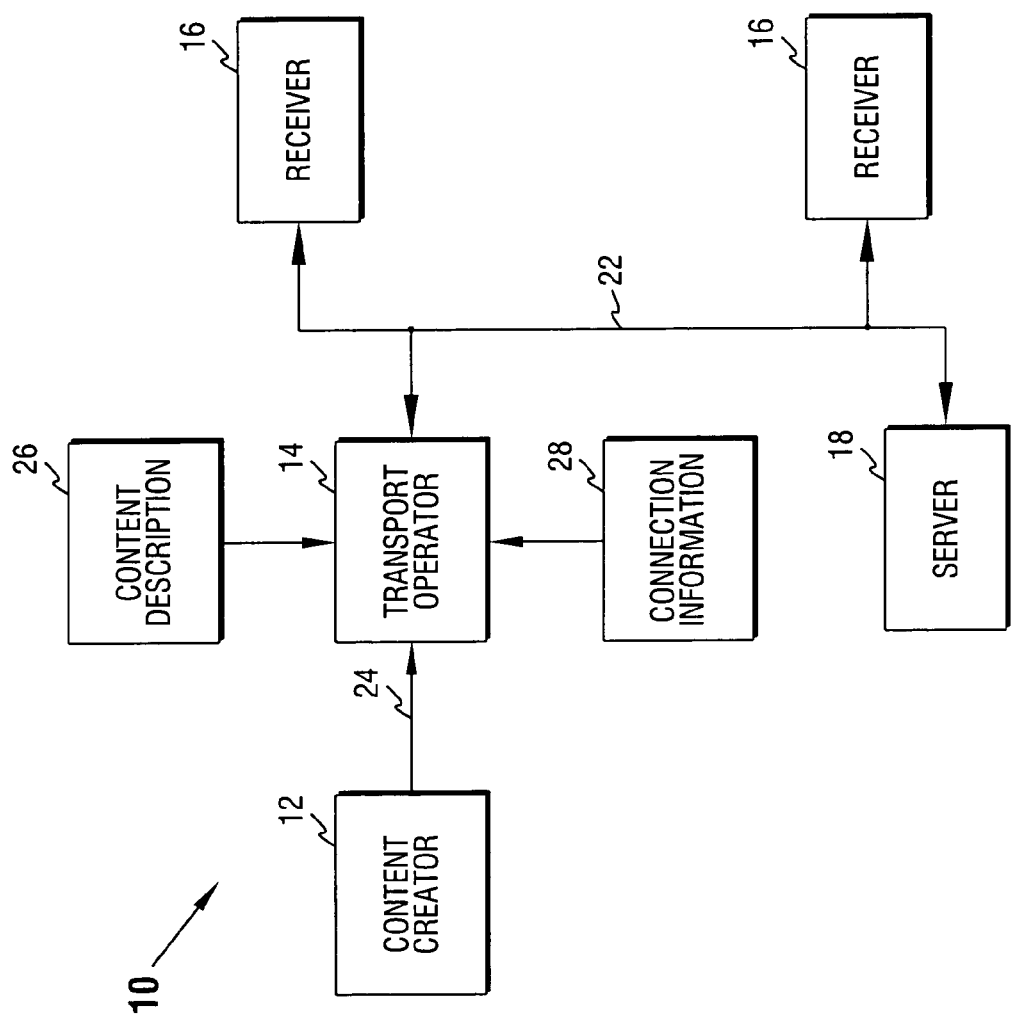
FIG. 1 is a block diagram of one embodiment of an information delivery system in accordance with the present invention.

Referring to FIG. 1, an information delivery system 10 according to one embodiment of the invention includes a content creator 12, a transport operator system 14, and a plurality of receivers 16. The receivers 16 may be located at various receiving sites, including homes, offices, entertainment facilities, or other locations. The content creator 12 originates ancillary data and television content (or other types of content including audio and/or video data) to be transmitted by the transport operator system 14. Alternatively, the content creator 12 may create ancillary data, with television content provided by another source, to the transport operator system 14.

Ancillary data may include graphics (e.g., web pages, multimedia information, or other digital data files), presentation layouts, electronic content guides and synchronization information. The transport operator system 14 provides an enhanced content delivery infrastructure that may include terrestrial, cable, satellite, or other types of transmission facilities (either analog or digital). The audio/video content and ancillary data may be transmitted over a transport medium 22, which may be a terrestrial, cable, satellite, or other type of link, to the receivers 16. The receivers 16 may include televisions, set-top boxes, personal computers, or other types of systems adapted to receive audio/video content and associated ancillary data. In certain embodiments, a server 18 may be coupled to the receivers 16 and the transport operator system 14.

As used in this description, the term audio/video (A/V) content is intended to include any type of audio and/or video data that may be transmitted or distributed to one or more receiving sites for presentation to viewers and/or listeners. As used here, A/V content may refer to content that may include both an audio and a video portion or one of an audio or video portion.

In MPEG-2 based systems such as ATSC (Advanced Television Systems Committee) or DVB (Digital Video Broadcasting), transport stream programs correspond to what is commonly thought of as TV channels. MPEG stands for Moving Picture Experts Group, and the MPEG-2 standard is described in ISO/IEC 13818-1 (MPEG-2 Systems), ISO/IEC 13818-2 (MPEG-2 Video) and ISO/IEC 13818-3 (MPEG-2 Audio), dated in 1994 and provided by the International Organization for Standardization (ISO) and the International Electrotechnical Commission (IEC). A description of ATSC may be found in "Guide to the Use of the ATSC Digital Television Standard," dated October 1995. DVB standards may be available from the web site {http://www.etsi.org}. A description of DVB may be found in "Digital Video Broadcasting (DVB); Specification for Service Information (SI) in DVB Systems" (ETS 300468, February 1998) available from the European Telecommunications Standards Institute (ETSI), Cedex, France.

These transport stream programs can contain audio, video, and data (e.g., ancillary information), with all of them tightly associated with that single transport stream program. When a user tunes to the transport stream program, the receiving device knows the audio, video, and data that are associated because they are marked as being part of the same program. The ancillary data may also be provided separately from the audio/video content.

An announcement may be transmitted either separately from the audio/video content or in conjunction therewith. The announcement may provide information useful for understanding what information has been transmitted and for coordinating information transmitted at different times that relates to different subject matters. Thus, as used herein, the term "announcement" is merely intended to refer to information other than content that is provided over the broadcast system.

Thus, an announcement may include both connection information and content description information. The content description information is useful to obtain information about the substance of the information that has been transmitted in the content stream. Thus, content description information may be utilized for generating electronic content guides or other displays at the receiver. Connection information provides information about the transport that has been used to provide the information to the receiver. Depending on the service multiplex and transport that is chosen for the particular system, different information may be provided as connection information. For example, in a satellite system, the connection information may constitute information about the satellite such as a satellite transponder identifier or a satellite identifier. In other systems, the connection information may amount to information corresponding to a channel number.

Thus, in one embodiment of the present invention, the audio/video content 24 may be received from a content creator 12 and transmitted by a transport operator over a service multiplex and transport 22 to a plurality of receivers 16. The transport operator 14 may also transmit, either with that content or separately therefrom, content description information 26 and connection information 28.

Figure 2:
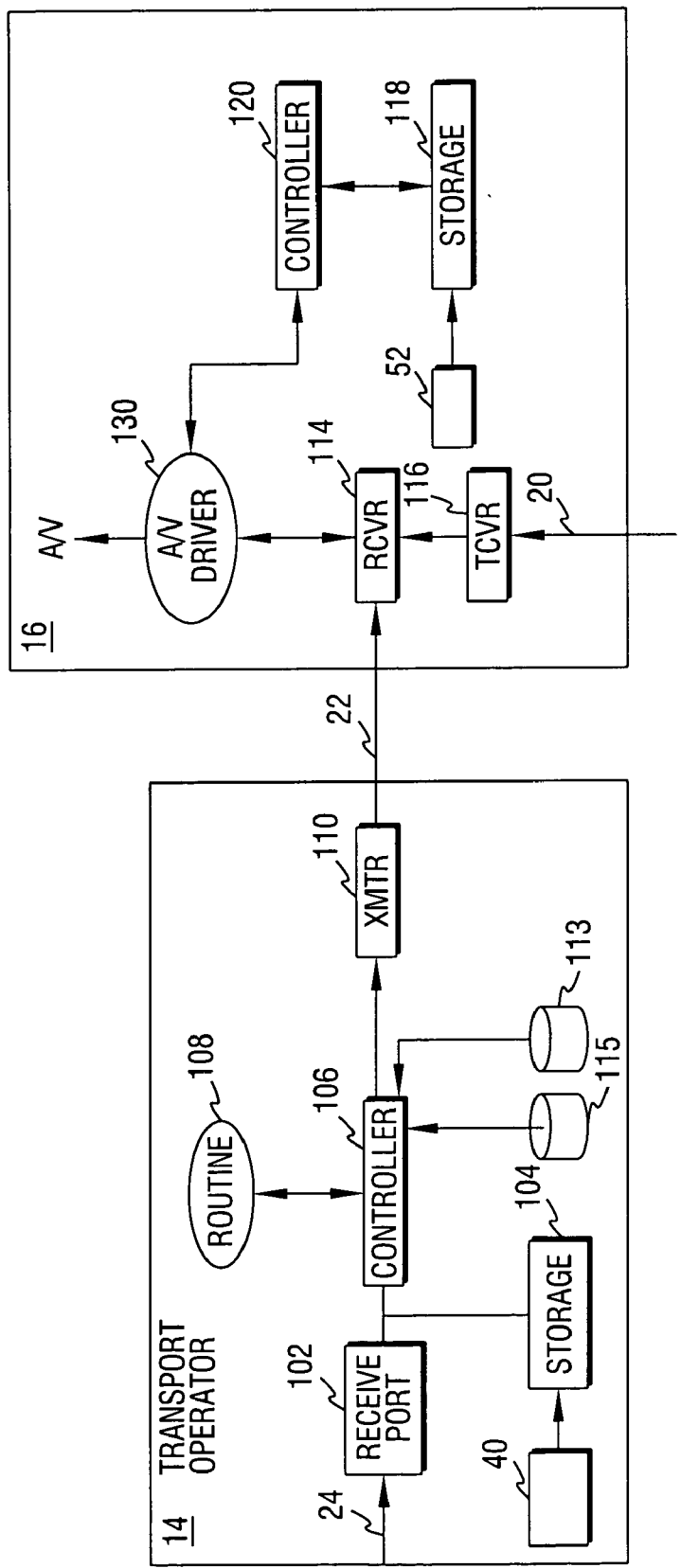
FIG. 2 is a block diagram of a transport operator system, receiving system, and server according to one embodiment of the information delivery system of FIG. 1.

Referring to FIG. 2, the transport operator system 14 may include a receiving port 102 to receive audio/video content information from a content creator 12 over a link 24. Content description information 26 and the connection information 28 may be provided to a controller 106 in the transport operator system 14. The controller 106 may be run under control of a software routine 108 (referred to as a transport routine). The transport routine 108 may initially be stored in a storage medium 104 and loaded by the controller 106 for execution. The information 28 may also be temporarily stored in the storage medium 104.

The transport operator may receive content description information as indicated at block 26 as well as connection information as indicated at block 28. The content description information, which may be in the form of meta-data, may be part of an announcement stream such as a data program guide (DPG). The content description provides information about the nature of the audio/video content that is also being transmitted. Thus, the transport system 14 may transmit a separate announcement which includes the content description information. In addition, the transport operator system 14 may provide a separate announcement which includes the connection information 28. The connection information identifies the broadcast network connections that carry one or more of the data components that comprise the content associated with a broadcast session. For example, that content may be an event or television program as two examples.

As a result, the content description information may be broadcast as a separate announcement well in advance of the actual connection information. In some embodiments of the present invention, by uncoupling these two components of signaling information, the content description may be transmitted before it is known precisely how the connection to the content will actually be implemented. Once the assignment of a connection has been determined, the connection information may be transmitted and linked to the previously transmitted content description. This enables dynamic management of the connection information in the broadcast network.

Thus, in some embodiments of the present invention, the content description may be utilized, for example to develop an electronic content guide. In addition, the content description may be transmitted with the actual audio/video content at a desirable time. In a time interval of high audio/video traffic, only the connection information may be transmitted, thereby shifting the network bandwidth usage (for the audio/video content) in a way which may be advantageous in some embodiments of the present invention.

The standard connection signaling mechanisms may be utilized in accordance with some embodiments of the present invention as currently defined, for example, in the ATSC and DVB Standards. For example, a service description framework may include the definition of a data services table (DST) that is carried in MPEG-2 private sections in accordance with applicable standards. According to the DVB standard, a similar mechanism may be used to associate distinct data components of content with a logical identifier that identifies a broadcast network connection.

The connection information associated with the logical identifier may be carried in the DST for example. The connection information may be delivered to the receivers 16, providing adequate information to allow a receiver to locate the connection information given a connection identifier. Thus, in one embodiment of the present invention, a connection information decoder component decodes the identifier and links it to the desired information.

In one embodiment of the present invention, separate storage media 113 and 115 coupled to the controller 106 may be provided for storing separately the content description information 26 and the connection information 28. In some embodiments of the present invention, a storage for the connection information 28 may be all that is provided. Thus, the connection information may be accumulated for later transmission. In such case, a template or place holder for the connection information may be stored in the storage 115. The template may provide the necessary linking information to link the connection information to the content description information and/or the audio/video content.

In the receiving system 16, a receiver circuit 114 (e.g., a TV tuner card) is adapted to receive content over the transport medium 22 and a transceiver 116. The receiving circuit 114 may be associated with an A/V device driver routine 130 that forwards the received A/V content to application software adapted to process and present the A/V content in the receiving system. The link 20 may provide a connection to another data source such as the Internet.

Application routines, device drivers, and other routines or programs may be executable on a controller 120. Such routines or programs may be initially stored in a storage medium 118 and loaded by the controller 120 for execution.

Once the two announcement streams have both arrived at a receiver 16, the streams may be linked to one another. In addition, it may be desirable to link the content description to the identity, such as a television channel number, of a service carrying the content. It may also be desirable to link the content description to a logical connection identifier for each data component of the content, to whatever granularity is desired. As an example, an "item", "group" hierarchy model may be defined in which "items" identify the lowest granularity of data components. The items may be coalesced into "groups". In this example, the connection information may be provided at the group level, item level, or some combination of both. For instance, within any given group, a connection identifier value for "use single group connection" may be used by some of the group items while the remainder of the items specify connections of their own. While an example with two levels of granularity is described, those skilled in the art should appreciate that any given number of granularity levels may be implemented in this fashion.

In some cases it may not be necessary to provide a service identifier. If the content description is carried with the broadcast service, a service identifier is obviously unnecessary. If the content description is carried outside of the service, for example combined with content descriptions for all services in the form of a data program guide, the content description specifies the service identifier. In the case of satellite transmissions, a satellite transponder identifier may be specified as well as a satellite identifier in some embodiments.

Figure 3:
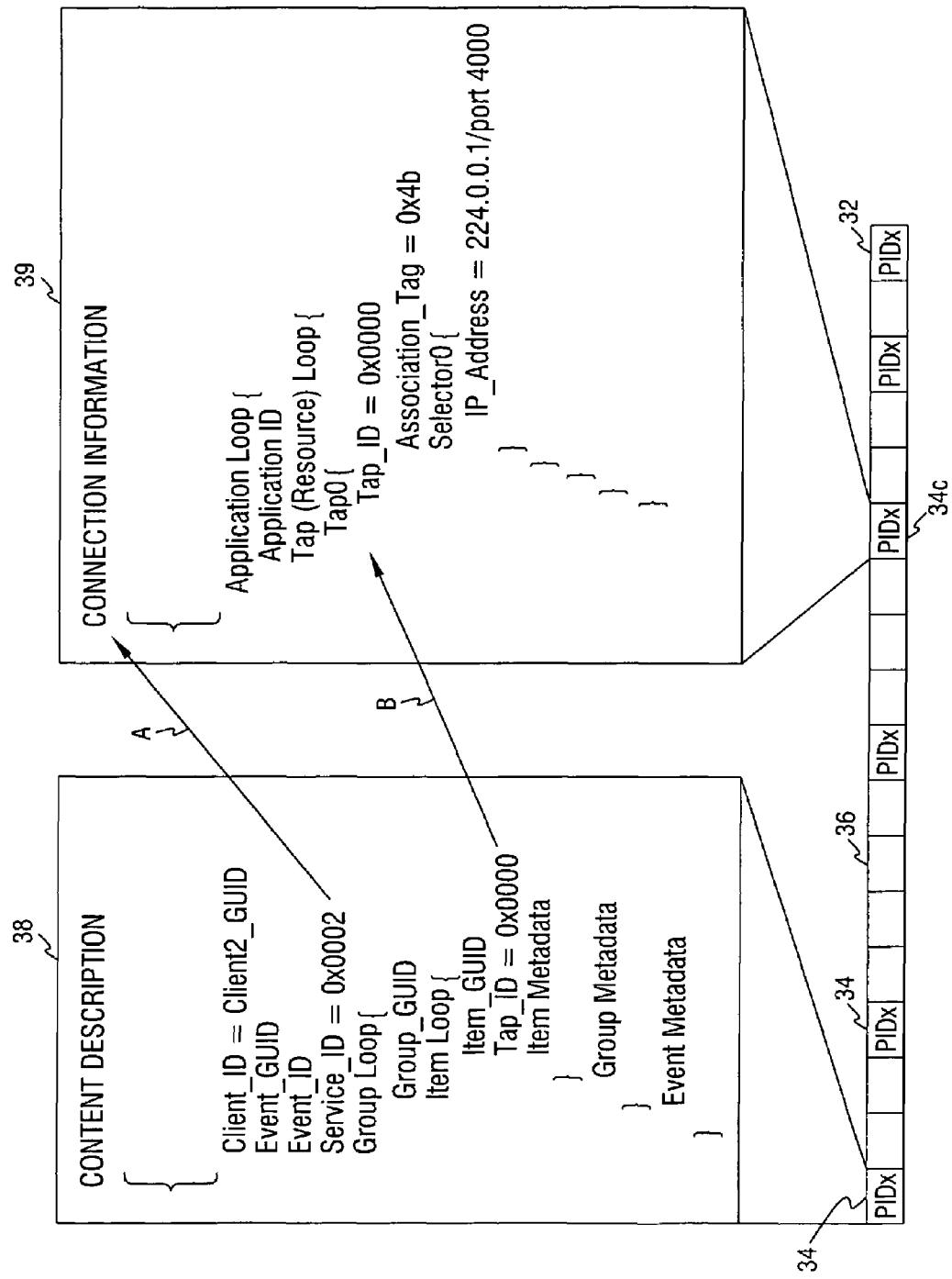
FIG. 3 is a schematic depiction in accordance with one embodiment of the present invention.

The specification of a connection information format may define how to acquire the connection information from a well defined location in the transport stream. Referring to FIG. 3, the transport stream 32 may be an MPEG-2 transport stream with a series of program identifiers (PIDs) 34 separated by other data 36. The PID 34*a* may include a content description. The PID 34*c* may provide connection information associated with at least part of the content description. Thus, it may be appreciated that the connection information may be provided at a later time, spaced upstream from the associated content description.

Once the content description is acquired from the transport stream, it may be used to point to a specific instance of later received connection information data. The content description and connection information may be managed separately in order to provide the capability to send a content description to the receiver 16 well in advance of knowing (or needing to know) what the connection to the data components of the content are or will be carried on. Thus, the content description may provide an identifier at the group level that "connects" to the content information and an identifier at the item level that "connects" to corresponding information in the connection information.

For example, referring to FIG. 3, the content description 38 may include a service_ID (0x0002) that may link, as indicated by the arrow A, to corresponding connection information 39 for that service (e.g. channel). The group and item level descriptions may include an item tap_ID (0x0000) that links, as indicated by the arrow B, to a tap_ID (0x0000) indicated in the connection information and including an Internet protocol (IP) address to make the correction. See Request for Comments (RFC)_available at www.ietf.com. Thus, corresponding granularities in the content description and connection information may be linked.

Figure 4:
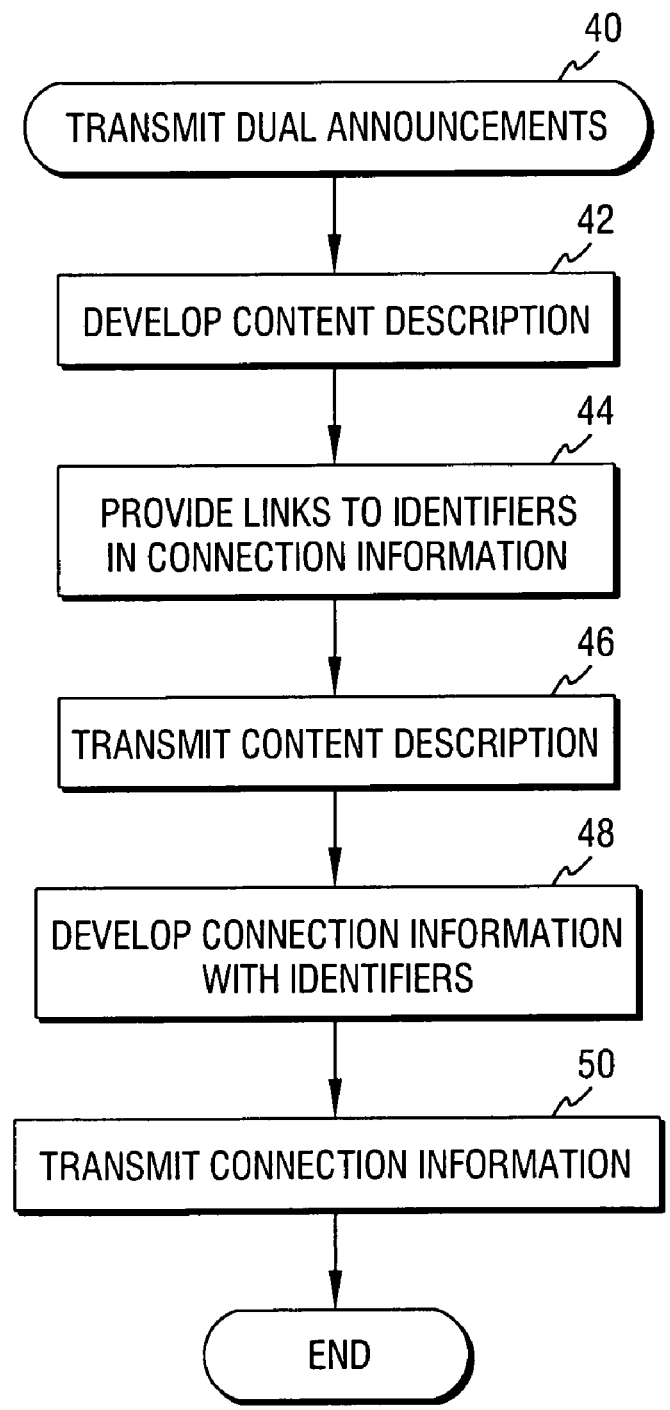
FIG. 4 is a flow chart showing software resident on the transport operator in accordance with one embodiment of the present invention.

Referring next to FIG. 4, software 40 for transmitting dual announcements, stored on the storage 104 for example, may cause the controller 106 to develop a content description as indicated in block 42. The content description may be loaded with links to identifiers in the connection information as indicated in block 44. The content description may then be transmitted as indicated in block 46. In some embodiments of the present invention, the content description may be transmitted separately from the audio/video content. In other embodiments, it may be transmitted together with that information.

When the connection information becomes available, the connection information may be developed with appropriate identifiers linking to the identifiers previously provided for the content description, as indicated in block 48. In some cases, a template or place holder that was developed at the same time as the controller developed the content description may be utilized to insert the connection information. Thus, the connection information may simply be snapped into a template that was created with the appropriate identifiers and stored in the storage 115, in one embodiment of the present invention. Thereafter, the connection information may be transmitted to the receiver 16 as indicated in block 50.

Figure 5:
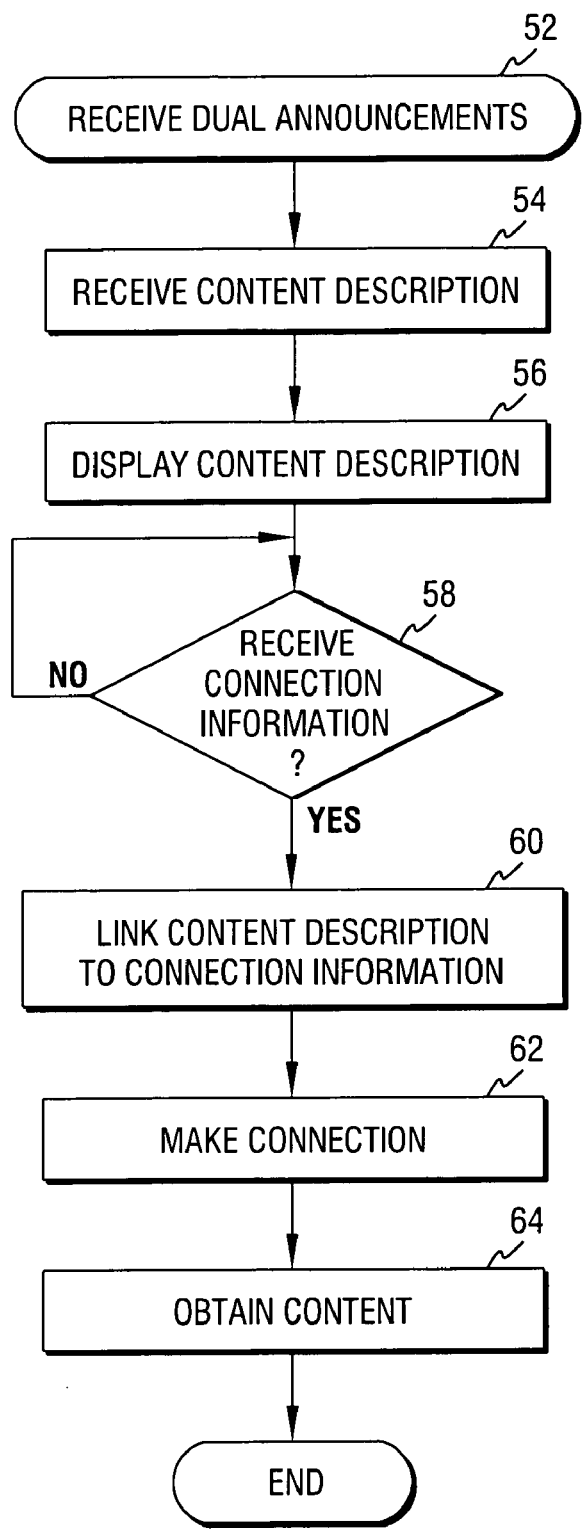
FIG. 5 is a flow chart showing software resident on a receiver in accordance with one embodiment of the present invention.

Referring to FIG. 5, at the receiver, software 52, in accordance with one embodiment of the present invention, may cause the content description announcement to be received as indicated at block 54, for example prior to receipt of the content information announcement. The content description may be displayed as indicated at 56 to enable use of the information, for example in connection with the electronic content guide. This allows the user to decide what the user wishes to see without requiring the user or the system to necessarily know how the service is actually going to be provided.

As indicated in diamond 58, the software checks for the receipt of the associated connection information. When the associated connection information is received, the content description may be linked to the connection information using the identifiers as indicated in FIG. 3 and in block 60 of FIG. 5. In one embodiment of the present invention, a connection may then be made through the connection information to the source as indicated in block 62 of FIG. 5. As a result, the associated content may be obtained as indicated in block 64.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
transmitting a first announcement including a content description for content arranged with at least two levels of granularity, the first announcement transmitted before any assignment of connection has been determined for the content, said first announcement including a service identifier to link with a second announcement;
thereafter transmitting said second announcement including connection information for the content, including linking each of the granularity levels to connection information for the granularity; and
transmitting the content after the first announcement and the second announcement.

2. The method of claim 1, wherein transmitting said content description includes transmitting a data program guide.

3. The method of claim 1, further comprising transmitting the content via a satellite.

4. The method of claim 1, further comprising accumulating the connection information at a transport operator for later transmission via the second announcement.

5. A method comprising:
transmitting a first announcement including a content description for content, the first announcement transmitted before any assignment of connection has been determined for the content, said first announcement including a service identifier to link with a second announcement;
thereafter transmitting said second announcement including connection information for the content that specifies the location of service in said connection information; and
transmitting the content after the first announcement and the second announcement.

6. The method of claim 5, further including transmitting ancillary information with said content.

7. The method of claim 5, further comprising transmitting the content description with at least two levels of granularity.

8. The method of claim 5, further comprising transmitting the content via a satellite.

9. An article comprising a medium to store instructions that if executed enable a system to:
transmit a first announcement via a digital broadcast, the first announcement including a content description for content, the first announcement transmitted before any assignment of connection has been determined for the content;
thereafter transmit a second announcement including connection information for the content;
transmit the content after the first announcement and the second announcement;
provide a service identifier to link said first and second announcements; and
generate the second announcement using a template while the first announcement is generated.

10. The article of claim 9, further storing instructions that if executed enable the system to arrange said content description with at least two levels of granularity.

11. The article of claim 10, further storing instructions that if executed enable the system to specify the location of service in said connection information.

12. The article of claim 9, further storing instructions that if executed enable the system to include the service identifier in the first announcement and the second announcement.

13. A system comprising:
a processor; and
a transmitter coupled to said processor to transmit a first announcement including a content description for content, the first announcement transmitted before assignment of connection has been determined for the content, thereafter transmit a second announcement including connection information for the content, the connection information to specify the location of service, and transmit the content after the first announcement and the second announcement.

14. The system of claim 13, further comprising a first storage coupled to said processor to store a template for said second announcement, said template formed before said connection information is available.

15. The system of claim 14, wherein the template is to include linking information to link the second announcement with the first announcement.

16. The system of claim 14, further comprising a second storage coupled to the processor to store the content description.

17. The system of claim 13, wherein said transmitter to transmit a service identifier to link said first and second announcements.

* * * * *